(12) United States Patent
Vandervoort

(10) Patent No.: US 9,904,318 B2
(45) Date of Patent: Feb. 27, 2018

(54) EDGE COMPONENT SHELL WITH REDUCED HEIGHT PORTION

(71) Applicant: Microsoft Technology Licensing, LLC, Redmond, WA (US)

(72) Inventor: David C. Vandervoort, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/078,763

(22) Filed: Mar. 23, 2016

(65) Prior Publication Data
US 2017/0277220 A1   Sep. 28, 2017

(51) Int. Cl.
G06F 1/16   (2006.01)
H01R 24/64  (2011.01)
H01R 12/72  (2011.01)
H01R 107/00 (2006.01)

(52) U.S. Cl.
CPC .......... *G06F 1/1626* (2013.01); *G06F 1/1637* (2013.01); *G06F 1/1658* (2013.01); *H01R 12/727* (2013.01); *H01R 24/64* (2013.01); *H01R 2107/00* (2013.01)

(58) Field of Classification Search
CPC combination set(s) only.
See application file for complete search history.

(56) References Cited

U.S. PATENT DOCUMENTS

| 6,231,363 | B1 | 5/2001 | Kosmala | |
|---|---|---|---|---|
| 6,845,007 | B1 * | 1/2005 | Baiko | G06F 1/1626 361/679.4 |
| 7,004,794 | B2 | 2/2006 | Wang | |
| 7,249,978 | B1 | 7/2007 | Ni | |
| 7,259,967 | B2 | 8/2007 | Ni | |

(Continued)

FOREIGN PATENT DOCUMENTS

| CN | 102843461 | 12/2012 |
|---|---|---|
| EP | 2498202 | 9/2012 |

OTHER PUBLICATIONS

"BlitzWolf Lightning to USB Cable 3.33ft/1m for iPhone 6 6Plus 5 5S iPad iPod", Retrieved at: http://www.banggood.com/Apple-MFI-Certified-BlitzWolf-Lightning-To-USB-Cable-3_3ft1m-For-iPhone-6-6Plus-5S-iPad-p-987610.html—on Dec. 10, 2015, 10 pages.

(Continued)

*Primary Examiner* — Lisa Lea Edmonds

(57) ABSTRACT

Edge component shells having reduced height portions are described herein. In one or more implementations, a computing device includes a housing configured to contain and secure componentry for the computing device. A display module for the computing device is positioned within the housing with a topside of the display module being oriented towards an outside of the housing. An edge component such as connection port, wireless radio device, sensor, or other component integrated with the computing device is configured with a shell having a reduced height portion. The edge component is arranged in the housing with the reduced height portion of the shell positioned underneath the display module such that the display module partially overlaps the shell of the edge component along an underside of the display module.

20 Claims, 7 Drawing Sheets

(56) References Cited

U.S. PATENT DOCUMENTS

| | | | |
|---|---|---|---|
| 7,410,371 B2* | 8/2008 | Shabtai | G06F 1/16 439/131 |
| 7,412,249 B2 | 8/2008 | Yoo | |
| 7,428,605 B2 | 9/2008 | Chin-Nan | |
| 7,440,269 B2* | 10/2008 | Liao | A45D 33/26 132/218 |
| 7,918,689 B2* | 4/2011 | Sloey | H01R 13/405 439/607.01 |
| 8,630,096 B2 | 1/2014 | Kim | |
| 8,644,032 B2* | 2/2014 | Liang | H05K 5/0247 361/679.3 |
| 8,775,710 B1* | 7/2014 | Miller | G06F 1/1626 361/679.17 |
| 8,953,311 B2* | 2/2015 | Moser | G06F 1/182 361/679.32 |
| 2003/0198010 A1* | 10/2003 | Homer | G06F 1/1601 361/679.55 |
| 2006/0028791 A1* | 2/2006 | Huang | G06F 1/1601 361/679.08 |
| 2010/0035463 A1* | 2/2010 | Wang | G06F 1/16 439/501 |
| 2011/0019360 A1* | 1/2011 | Thabit | G06F 1/1611 361/679.55 |
| 2011/0267772 A1* | 11/2011 | Valenzuela | G06K 7/0021 361/679.55 |
| 2012/0268898 A1 | 10/2012 | Yu | |
| 2013/0215567 A1* | 8/2013 | Morita | G06F 1/1637 361/679.27 |
| 2014/0153176 A1* | 6/2014 | Ashcraft | G06F 1/166 361/679.21 |
| 2014/0325180 A1* | 10/2014 | Lee | G06F 1/1656 712/29 |
| 2014/0347812 A1* | 11/2014 | Lee | G06F 1/1679 361/679.55 |

OTHER PUBLICATIONS

Pogue,"Reviewed: The Thinnest, Loveliest MacBook You'll Never Buy", Retrieved at: https://www.yahoo.com/tech/its-so-easy-to-blast-apple-for-sacrificing-115905930724.html, Apr. 9, 2015, 10 pages.

Purcher,"Taiwan's Supply Chain Makers Freak Out Over Apple's Patent Pending USB/SD Hybrid Port Design", Retrieved at: http://www.patentlyapple.com/patently-apple/2013/07/taiwans-supply-chain-makers-freak-out-over-apples-patent-pending-usbsd-hybrid-port-design.html, Jul. 5, 2013, 3 pages.

* cited by examiner

EDGE COMPONENT SHELL WITH REDUCED HEIGHT PORTION

BACKGROUND

The configurations of computing devices are ever increasing, from traditional desktop personal computers to mobile computing devices such as mobile phones, slate or tablet computers, and so on. Form factors employed by these devices may also vary greatly. However, conventional techniques to support external connections and different types of device components may limit the configurations and form factors that may be employed by these devices.

For example, connectors and other components located along device edges place constraints upon the size and thickness of a computing device. In particular, some edge components have a shape and size that limits the device in one or more dimensions. In order to achieve a sleek and relatively thin device, conventional connectors and components having thicknesses relatively close to the designed overall device thickness (e.g., z-depth) may have to be located entirely outside of the usable display area, such as within a bezel region. Doing so, though, increases the overall dimensions of the device and limits the amount of usable display area that may be provided by the device design.

SUMMARY

Edge component shells having reduced height portions are described herein. The shell forms the outer surfaces for an edge component such as a connection port, wireless radio device, sensor, or other component. Rather than using a shell that is a regular cuboid with a uniform thickness, a portion of the shell has a reduced height that enables the shell to be stacked underneath a display module. In one or more implementations, a computing device includes a housing configured to contain and secure componentry for the computing device. A display module for the computing device is positioned within the housing with a user facing surface of the display module being oriented towards an outside of the housing. An edge component integrated with the computing device is configured with a shell having a reduced height portion. The edge component is arranged in the housing with the reduced height portion of the shell positioned underneath the display module such that the display module partially overlaps the shell of the edge component along an underside of the display module.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
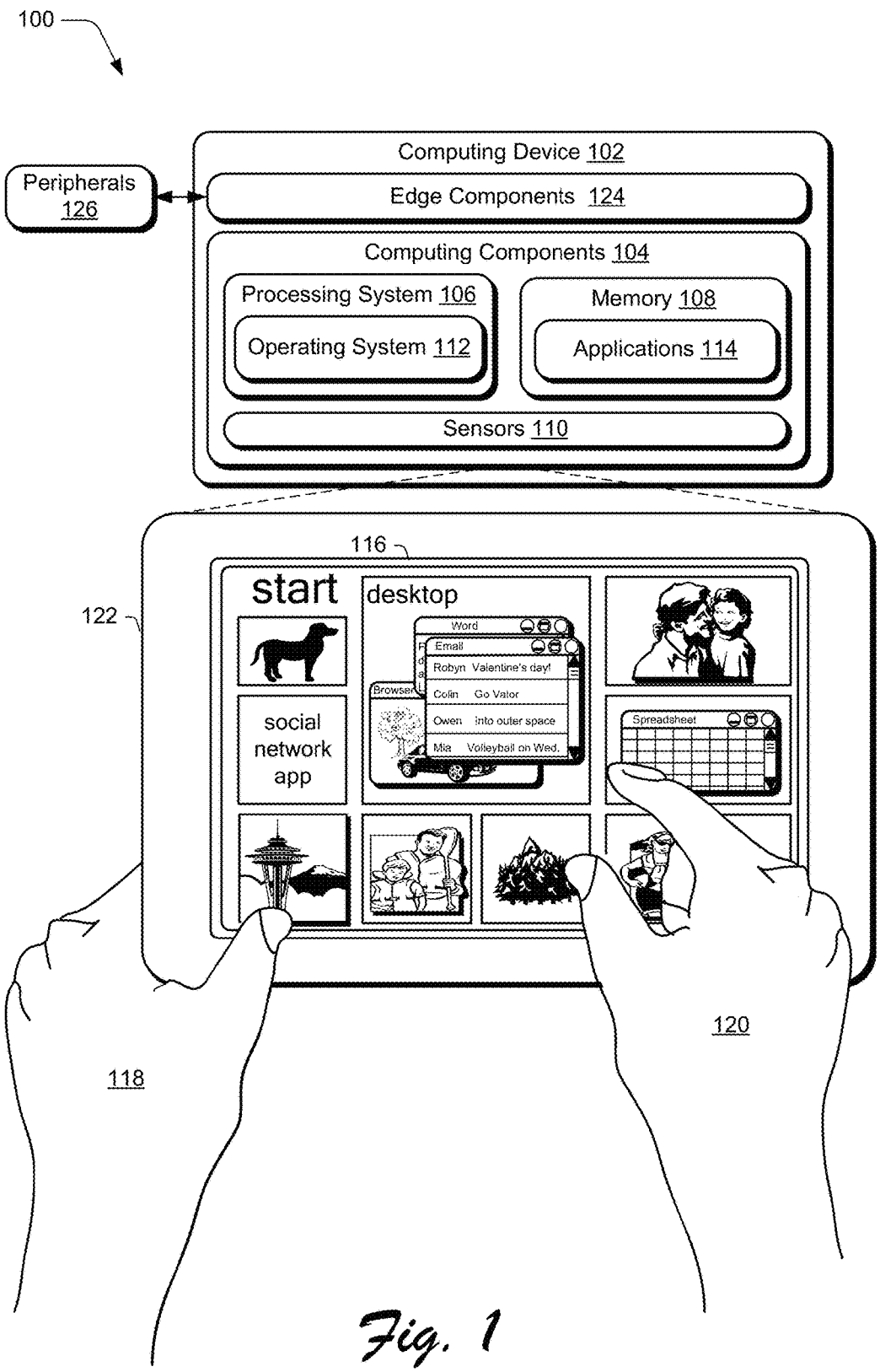
FIG. 1 is an illustration of an environment in an example implementation that is operable to employ the techniques described herein.

Traditionally, edge components (e.g., peripheral ports, connectors, sensors, EMI shields, etc.) for computing device designs employ a configuration in which the housing or shell of the components has a uniform, generally rectangular shape. In other words, the shell that forms the outer surfaces for such an edge component is a regular cuboid having a uniform thickness. The cuboid shaped components are popular as they are relatively simple and inexpensive to manufacture as well as easy to handle during device assembly. However, the thickness of the components places constraints on how and where the components may be employed in the device design. For instance, stacking multiple components in layers increases the thickness of the device (e.g., z-depth). On the other hand, arranging components beside one another requires the width and/or height of the device to increase. Thus, incorporating edge components into a device design involves tradeoffs between device size, device thickness, and the functionality that is provided by the device and different edge components.

Edge component shells having reduced height portions are described herein. The shell forms the outer surfaces for an edge component such as a connection port, wireless radio device, sensor, or other component. The full height portion of the shell fulfills the height requirement for things such as standard sized connectors. Rather than using a shell that is a regular cuboid with a uniform thickness, a portion of the shell has a reduced height that enables to shell to be stacked underneath a display module in the device design. In one or more implementations, a computing device includes a housing configured to contain and secure componentry for the computing device. A display module for the computing device is positioned within the housing with the topside (e.g., user facing surface) of the display module being oriented towards an outside of the housing. An edge component integrated with the computing device is configured with a shell having a reduced height portion. The edge component is arranged in the housing with the reduced height portion of the shell positioned underneath the display module such that the display module partially overlaps the shell of the edge component along an underside of the display module.

Edge component shells having reduced height portions as described herein enable assemblies in which a display module may partially overlap the edge components. Consequently, a larger sized display module may be employed for a given design. In other words, for a device having specified overall dimensions, a ratio of the active screen area to the overall surface area may be increased by using the shell designs for edge components with reduced height portions described herein. Additionally, the shell designs enable device designs having thinner profiles and reduced bezel areas.

In the following discussion, an example environment is first described that may employ the techniques described herein. Example devices and techniques are then described which may be implemented in the example environment as well as other environments. Consequently, the example devices and techniques are not limited to the example environment and the example environment is not limited to the enumerated devices and techniques.

Example Environment

FIG. 1 is an illustration of an environment 100 in an example implementation that is operable to employ the techniques described herein. The illustrated environment 100 includes a computing device 102. In this example, the computing device 102 includes one or more computing components 104 which may be configured to perform and/or assist in performance of one or more operations of the computing device 102, e.g., in execution of instructions specified by software. Examples of computing components 104 include a processing system 106, memory 108, and sensors 110 with examples of software that include an operating system 112 and applications 114.

The computing device 102 may be configured in a variety of ways. For example, a computing device may be configured as a computer that is capable of communicating over a network, such as a desktop computer, a mobile station, an entertainment appliance, a set-top box communicatively coupled to a display device, a wireless phone, a game console, educational interactive devices, point of sales devices, wearable devices, and so forth. Thus, the computing device 102 may range from full resource devices with substantial memory and processor resources (e.g., personal computers, game consoles) to a low-resource device with limited memory and/or processing resources (e.g., traditional set-top boxes, hand-held game consoles). Additionally, although a single computing device 102 is shown, the computing device 102 may be representative of a plurality of different devices, such as multiple servers utilized by a business to perform operations such as by a web service, a remote control and set-top box combination, an image capture device and a game console configured to capture gestures, and so on.

The computing device 102 may support a variety of different interactions. For example, the computing device 102 may include one or more hardware devices that are configured to be manipulated by a user to interact with the device, such as a keyboard, cursor control device (e.g., mouse), and so on. The computing device 102 may also support gestures, which may be detected in a variety of ways. The computing device 102, for instance, may support touch gestures that are detected using touchscreen functionality of the computing device 102.

The sensors 110, for instance, may be configured to provide touchscreen functionality in conjunction with the display device 116. The sensors 110 may be configured as capacitive, resistive, acoustic, light (e.g., sensor in a pixel), and so on that are configured to detect proximity of an object. An example of this is illustrated in FIG. 1 in which first and second hands 118, 120 of a user are illustrated. The first hand 118 of the user is shown as holding a housing 122 (e.g., external enclosure) of the computing device 102. The second hand 120 of the user is illustrated as providing one or more inputs that are detected using touchscreen functionality of the display device 116 to perform an operation, such as to make a swipe gesture to pan through representations of applications in the start menu of the operating system 112 as illustrated. This may also apply to user input with an active or passive stylus.

The computing device 102 is also illustrated as including one or more edge components 124 that are configured in various ways to provided different types of functionality for the computing device. Generally, the edge components 124 are located along edges of the device, such as being positioned at least partially within a bezel region of the device housing 122. Various types of edge components 124 are contemplated. By way of example and not limitation, edge components 124 may include different peripheral ports or connectors, sensors, chipset enclosures and shields, logic devices, controllers, and other computing components that may be placed along device edges. Edge components 124 in the form of peripheral ports or connectors may be designed to facilitate connections to peripheral devices 126, one example of which is a Universal Serial Bus (USB) port that supports connection to USB peripherals. In accordance with techniques described herein, the edge components 124 including USB ports may include a shell having a reduced height portion. The reduced height portion is designed to fit underneath a display module of the display device 116 such that the display module partially overlaps the edge component 124. In this manner, the usable display area of the device may be increased and a thinner design for the device is made possible. In the case of a USB port, the USB port having a shell with a reduced height portion accommodates a full-sized, standard USB plug for peripheral devices 126 while still maintaining device thickness and creating a larger active screen area.

Figure 2:
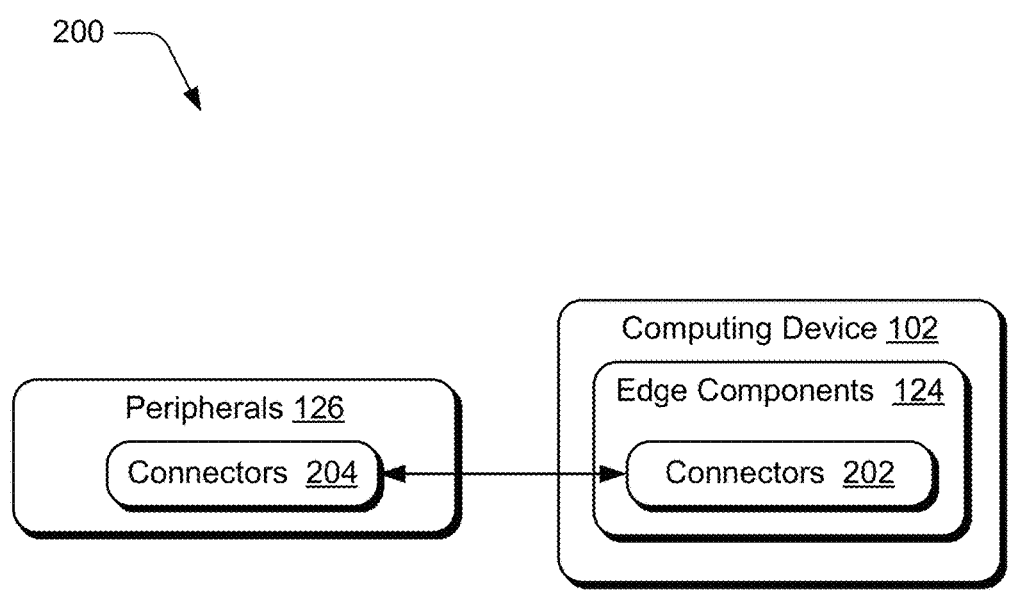
FIG. 2 is an illustration depicting a representation of computing device having edge components in the form of peripheral ports or connectors.

In this context, FIG. 2 is an illustration depicting generally at 200 a representation of computing device 102 having edge components 124 in the form of peripheral ports or connectors. In this example, the edge components 124 include connectors 202 that support physical and/or communicative connection of the computing device 102 to a peripheral device 126. A physical connection, for instance, may be configured to support a communicative coupling to support transmission of data, such as for use in a Universal Serial Bus, display port (e.g., mini display port), audio jack, microphone jack, Thunderbolt® connection, FireWire® connection, and so forth. The physical connection may also be configured to support a transfer of power, such as part of a Universal Serial Bus configuration, a dedicated power connection, and so on. Edge components 124 may also include devices that enable wireless connections to peripherals, such as wireless radios and communication hardware devices that provide wireless interfaces. In any case, connectors 202 of the edge components 124 are configured to mate with and/or connect to corresponding connectors 204 of peripheral devices 126. For example, a female port of the computing device may connect to a male plug of a peripheral device 126.

Peripheral devices 126 may assume a variety of different configurations such as an output device (e.g., display device, printer, speakers, headphones), input device (e.g., keyboard, mouse, camera in support of a natural user interface or webcam), storage device (e.g., memory device), communication device (e.g., network connection device), and so on. Additionally, the connectors 202, 204 of the computing device 102 and the peripheral device 126 may also be configured in a wide variety of ways. Although some aspects discussed herein are described in the context of Universal Serial Bus (USB) ports and devices, other configurations and arrangements are also contemplated without departing from the spirit and scope thereof.

Figure 3A:
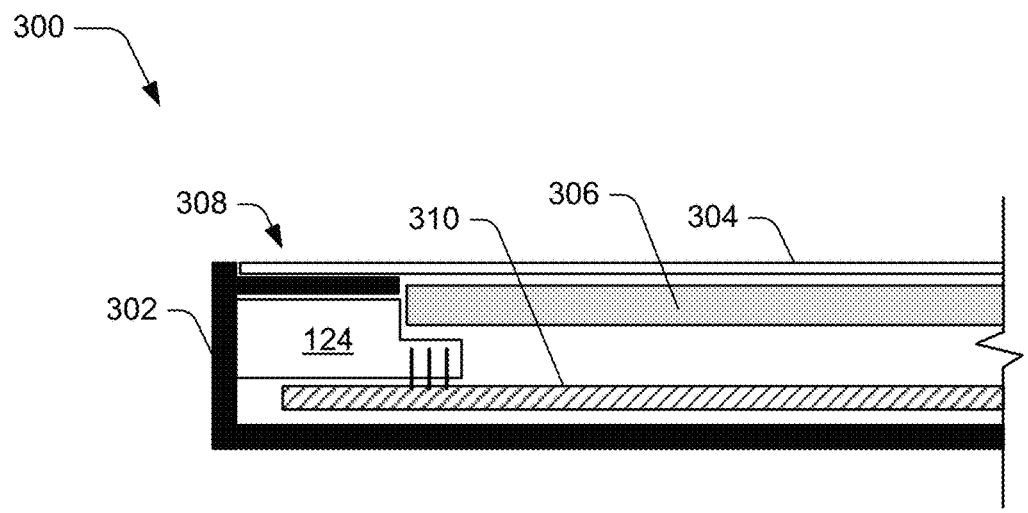
FIG. 3A depicts a cross sectional view of a device including an edge component having a shell with a reduced height portion in accordance with one or more implementations.
Figure 3B:
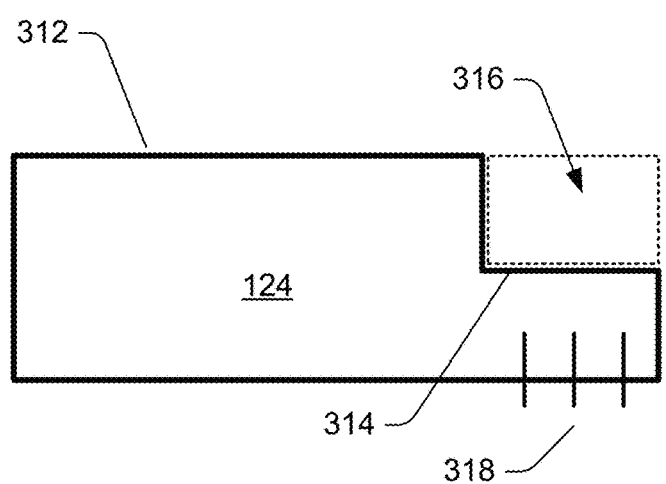
FIG. 3B is a diagram depicting an enlarged view of the edge component in FIG. 3A showing details in accordance with one or more implementations.

Consider now details regarding edge component shells having reduced height portions that are discussed in relation to examples of FIGS. 3A and 3B. In particular, FIG. 3A depicts generally at 300 a cross sectional view of a device including an edge component 124 having a shell with a reduced height portion in accordance with one or more implementations. FIG. 3B is a diagram depicting an enlarged view of the edge component 124 in FIG. 3A showing details in accordance with one or more implementations.

The example of FIG. 3A represents a portion of a thin form factor computing device 102, such as a tablet, laptop, or mobile phone. The edge components and techniques as described herein may also be employed with other types of apparatuses such as all-in-one computers, monitors, wearable devices, and so forth. FIG. 3A presents a view of a portion of the computing device 102 along an edge of the device. The example shows the assembly of the device including different components and layers that are stacked in the housing for the assembly. In particular, the example device represented in FIG. 3A includes a housing 302 that may be configured in various ways to contain and secure componentry including circuitry, interfaces, connectors, ports, and hardware for the computing device. The housing 302 is configured as an external enclosure for the computing device. A cover 304 is secured to the housing 302 to form one outer surface of the device. Generally, the cover 304 is a glass, plastic, or composite cover layer that extends from edge to edge across the device and acts as an outer surface of a display device 116 and the computing device 102.

A display module 306 for the display device 116 is positioned within the housing underneath the cover 304. An outer surface or "topside" of the display module 306 is configured to provide the active screen for the device and is oriented towards the outside of the device and housing. An inner surface or "underside" of the display module 306 opposite from the topside is oriented towards the interior of the device and housing. The display module 306 represents functional components (e.g., hardware, circuitry, fixed logic) used for presentation of information in a visual form. In other words, the display module 306 includes the operational components of the display device 116 that make it possible to display information and enable a user to view and interact with displayed information via the outer surface. The display module 306 may also include integrated touchscreen functionality operable to obtain and process touch inputs, as represented in FIG. 1. Various types of displays and corresponding display modules 306 are contemplated including but not limited to LCD, OLED, TFT, and electronic ink displays with or without integrated touchscreen capabilities. Although a separate cover layer is depicted, the cover for the device may alternatively be provided at least partially via an outer layer integrated with the display module 306 that acts as a cover.

The active screen area of the device generally depends upon the size of the display module 306. Accordingly, developers may seek to maximize the size of the display module 306 that may be accommodated by the housing 302 given design constraints such as the overall device size, components and functionality to include with the device, and so forth. As represented in FIG. 3A, the display module 306 does not extend fully to the edge(s) of the housing, but rather extends partially to the edges underneath the cover 304. Thus, the arrangement of the housing 302, cover 304, and display module 306 creates a bezel region 308 around the edges of the device.

Various components of the device may be physically and communicatively coupled via a printed circuit board (PCB) 310. The PCB 310 mechanically supports and electrically connects integrated circuit devices and other device components using conductive traces, pads, and other circuitry formed on a non-conductive substrate. Although a single PCB is depicted, a device may include one or more PCBs that are interconnected and generally includes at least a main PCB or "motherboard". In the depicted example, the PCB 310 is secured to the housing 302 towards an underside of the computing device/housing that is opposite the cover 304. Thus, the display module 306 is stacked in-between the cover 304 and the PCB 310. Further, edge components 124 having reduced height portions as described herein may be disposed in the housing with the reduced height portions sandwiched between the underside of the display module 306 and the PCB 310.

In traditional arrangements, some edge components (such as USB ports) having a thickness above a specified tolerance are confined to the bezel region of a device at least in part because placing these components underneath the display module 306 would necessitate an increase in the overall device thickness. Techniques described herein, though, provide shell designs for edge components with reduced height portions designed to fit underneath the display module 306 along the underside of the display module 306. As such, the display module 306 may partially overlap suitably configured edge components 124 along the underside and consequently a larger sized display module 306 may be employed for a design. In other words, for a device having specified overall dimensions, a ratio of the active screen area to the overall surface area may be increased by using the shell designs for edge components with reduced height portions as discussed above in below.

For example, FIG. 3A depicts an example edge component 124 that is configured in the manner described herein. The edge component 124 is located generally within the bezel region 308 and includes a portion with reduced height that fits underneath the display module 306, such that the underside of the display module overlaps the reduced height portion. The edge component 124 is physically and electronically connected to the PCB 310. Details of the example edge component 124 are discussed in relation to FIG. 3B.

The enlarged view of the edge component 124 in FIG. 3B represents a shell 312 for the component that includes a reduced height portion 314. As noted, computing components typically are formed in cuboid shapes such as cubed or rectangular solid shaped components. In the depicted example, the reduced height portion 314 results in a cutout portion 316 or "jogged" portion within the shell. Here, the reduced height portion 314 has a reduced height relative to an overall height (e.g., thickness) of the shell 312. In a traditional design, the outline of the component shell would encompass the full rectangle defined by both the shell 312 and the cutout portion 316 and have a uniform height. If the full rectangular shape was used for the shell design, though, the edge component 124 would not be able to fit underneath the display module 306 within the layers of the assembly in the manner depicted in FIG. 3A. Consequently, the overall size of the device would have to increase by expanding the edge boundaries of the device (e.g., the footprint) or increasing the thickness of the device to accommodate the full height of the rectangular shaped edge component.

Accordingly, the cutout portion 316 as described provides space for the display module 306 to overlap with the edge component 124 in the assembly. Consequently, the display module 306 can be stacked in the assembly between the cover and the edge component with the underside of the display module 306 overlapping the shell 312 of the edge component within the cutout portion 316. This makes it possible to reduce the bezel region 308 and increase the size of the display module as described herein. In implementations, the cutout portion 316 provides a shelf like structure, which the display module 306 fits into. The display module 306 may rest upon and/or be secured to the shelf like structure, however, other supporting structures may be used to support and position the display module 306 within the housing 302, with or without direct securing or contact of the display module 306 and the edge component 124, one to another. Accordingly, supporting structures and spacers may be employed to maintain a clearance gap between the display, the shelf structure and other components. Although the cutout portion 316 in the example has generally a rectangular shape, other shapes for the cutout portion 316 and corresponding reduced height portion 314 are contemplated such as a curved, faceted, or angled cutout. In implementations, the cutout portion 316 formed due to the reduced height portions is configured to have a shape that matches a shape along edges of the display module 306 that fits into the cutout portion 316 in the assembly. Thus, if the edges of the display module 306 are curved the cutout portion 316 may have a complimentary curved shape, or if the edges for right angled corners the cutout portion 316 may also have right angles (e.g., a rectangular cutout as depicted), and so forth.

FIG. 3B additionally represent contacts 318 of the edge component 124 that are employed to physically and communicatively connect the edge component 124 to the PCB 310. The contacts 318 represent conductive elements such as wires, traces, flexible cables or other mechanism employed to interconnect computing components. The contacts 318 may be soldered, clipped, or otherwise secured to the PCB 310.

In the depicted example, the contacts 318 are positioned within the reduced height portion 314 of the shell. In addition, or alternatively, contacts 318 for some edge component 124, such as connectors and ports, may extend across the shell 312 within both the reduced height portion 314 and the thicker portion of the shell. In this case, the contacts 318 are located to engage with complimentary contacts of a plug or connector for a peripheral device 126 that is inserted into the shell 312 to establish a connection. Moreover, the contacts 318 may be configured to include a jog in routing of contacts that follows the reduction in height of the shell. In other words, the contacts may be routed around the jog in the shell that is created due to the reduced height portion 314. The contacts 318 are routed through the reduced height portion 314 and may be secured to the PCB 310 generally on the underneath side of the reduced height portion 314 (e.g., side opposite the cover 304 and display module 306). Further details regarding jogged contacts are discussed in relation to the example of FIG. 6 below.

Figure 4:
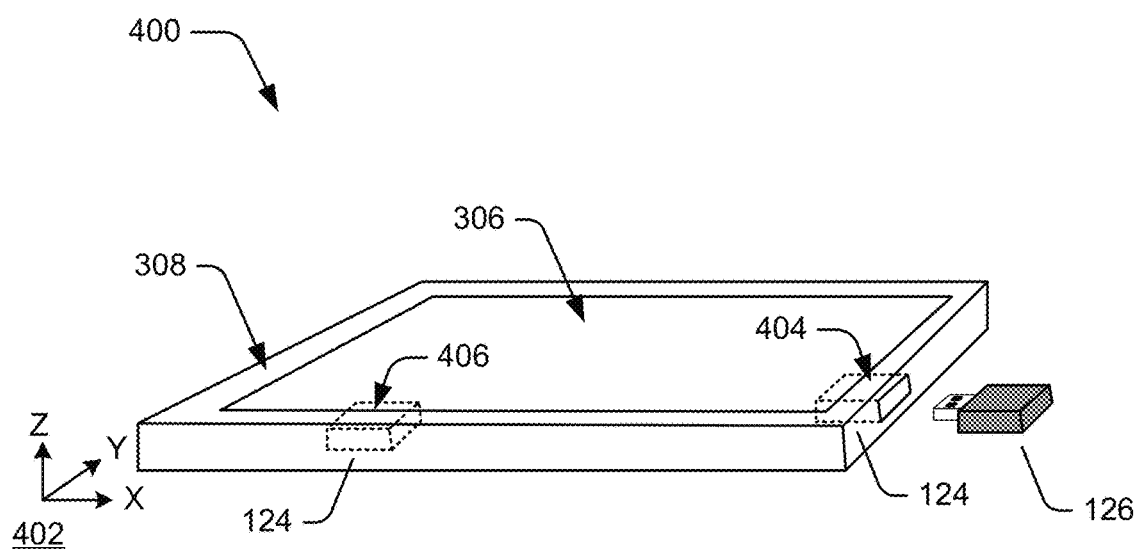
FIG. 4 depicts a diagram depicting a perspective view showing a thin form factor device that includes edge components in accordance with one or more implementations.

FIG. 4 depicts generally at 400 a diagram depicting a perspective view showing a thin form factor device that includes edge components in accordance with one or more implementations. FIG. 4 provides examples showing positioning of edge components 124 relative to the display module 306 and other device components. Here, the thin form factor device is depicted as a tablet or slate device with an outer surface of the device having a display screen oriented outward. A coordinate system 402 is depicted as defining x, y, and z axes of the device. In accordance with the coordinate system 402, the z-axis runs normal to a plane of the display screen. Thickness of the computing device is defined on this z-axis and consequently is referred to as z-depth.

As further represented in FIG. 4, the display module 306 defines the active display screen area indicated by the inner rectangular region. The bezel region 308 creates a frame that surrounds the active display screen area corresponding to the display module 306. As noted, edge components 124 configured in the manner described herein may be placed generally within the bezel region 308. Reduced height portions 314 of shells 312 for the edge components 124 enable the shell 312 to extend at least partially underneath the display module 306. Consequently, the size of the display module 306 can be increased and/or the z-depth for particular x-y dimensions of the device can be reduced relative to designs that use traditional, cuboid shell designs.

As noted, edge components 124 may include various connectors and ports. FIG. 4 further depicts generally at 404 an example edge component 124 in the form of USB connector that is connectable to a peripheral device 126, such as a USB flash drive, an external hard drive that uses a USB plug, or other USB device. Edge components 124 can also include internal sensors, radios, and devices other than ports and connectors as represented by the example edge component 124 shown generally at 406 in FIG. 4.

Figure 5:
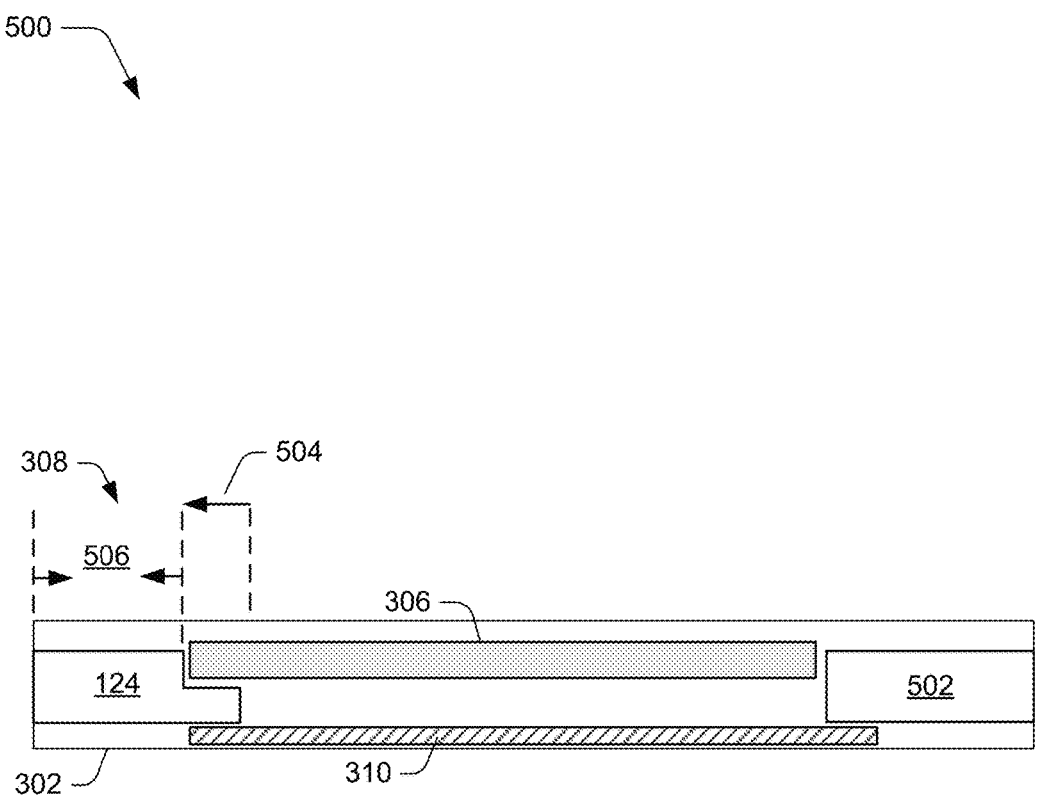
FIG. 5 depicts a diagram showing a comparison between edge components using shells with reduced height portions and edge components that utilize cuboid shells.

FIG. 5 depicts generally at 500 a diagram showing a comparison between edge components using shells with reduced height portions and edge components that utilize cuboid shells. The comparison is made between a device having an edge component 124 with the reduced height portion and the device having an edge component 502 with a cuboid shape.

The display module 306 is positioned within the cutout portion 316 in the shell 312 of the edge component 124. On the other hand, edge component 502 does not have a reduced height portion or a cutout. Therefore, the edge component 502 is located entirely outside of the usable display area defined by the display module 306. Thus, assuming the dimensions of the housing 302 remain the same, a larger display module 306 can be accommodated as indicated by the arrow 504 showing the increase in size of the display module 306. Likewise, the bezel region 308 is decreased as represented by the arrows 506 showing the decreased width of the bezel region 308. The edge components are represented as being connected to a printed circuit board (PCB) 310 or "system" board as previously described.

Figure 6:
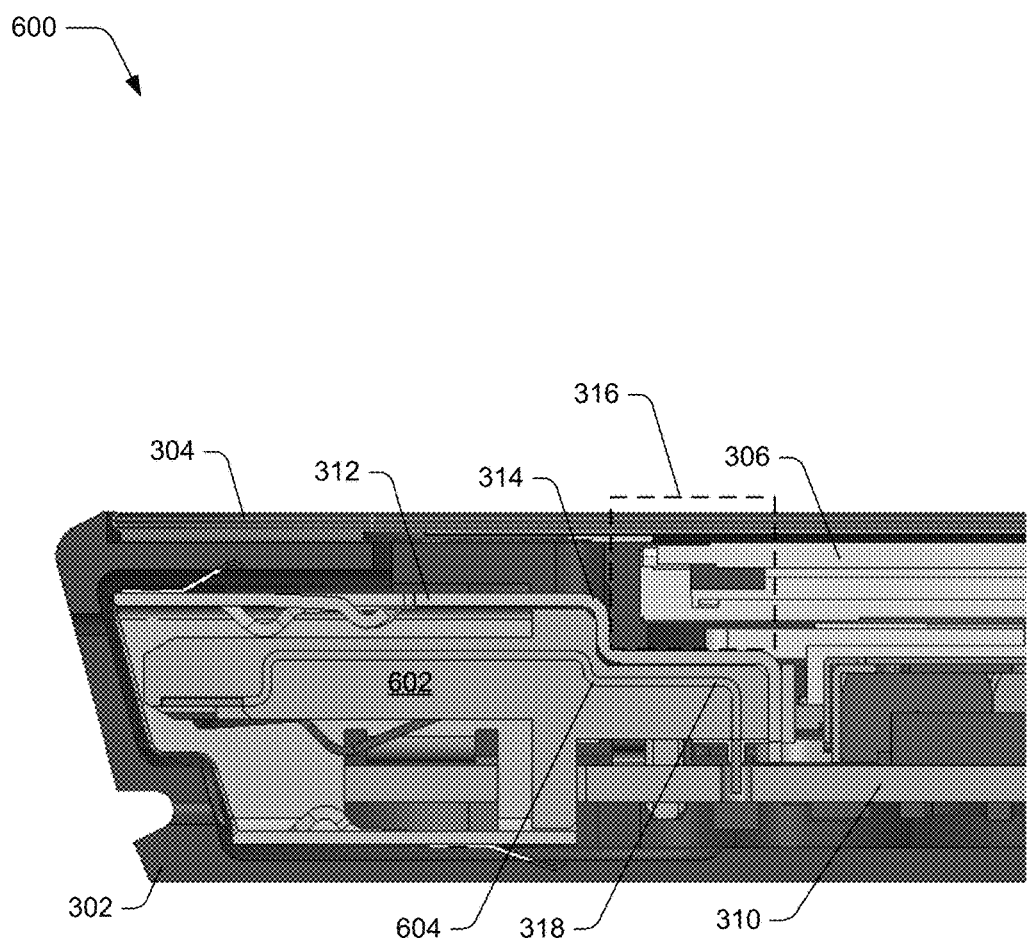
FIG. 6 depicts a cross sectional view of a device including an edge component having a shell with a reduced height portion in accordance with one or more implementations.

FIG. 6 depicts generally at 600 a cross sectional view of a device including an edge component having a shell with a reduced height portion in accordance with one or more implementations. In this example, the edge component 124 is configured as a USB port 602 or receptacle for a computing device that is configured to mate with a corresponding USB plug. The USB port includes a shell 312 as described previously that has a reduced height portion 314. The reduced height portion 314 creates a cutout portion 316 that is designed to enable a display module 306 to fit into the cutout portion 316 and overlap the shell 312 of the USB port 602.

The USB port 602 additionally includes contacts 318 that are designed to engage with complimentary contacts of a UB plug or connector inserted into the USB port 602 to establish a connection. The contacts 318 are soldered or otherwise secured to a PCB 310. As represented, the contacts 318 run through the USB port 602 and into the reduced height portion 314, where the contacts are routed through the shell 312 and connected to the PCB 310. In implementations, the contacts are configured as flex cable contacts routed between contact points for the port and the PCB. Other types of contact elements are also contemplated.

Moreover, the contacts 318 include a jog 604 in the routing that follows the reduction in height of the shell 312. Accordingly, the contacts may be routed around the jog in the shell that is created due to the reduced height portion 314. In this arrangement, the reduced height portion 314 of the shell is designed to provide electromagnetic interference (EMI) shielding for the contacts. At the same time, the full height remaining portion of the shell 312 accommodates a full size, standard USB plug. Additional complexity in designing and manufacturing the shell 312 having the reduced height portion 314, is offset by the increase in the active display area and/or reduced overall thickness that may be achieved by using the shell design.

Example System and Device

Figure 7:
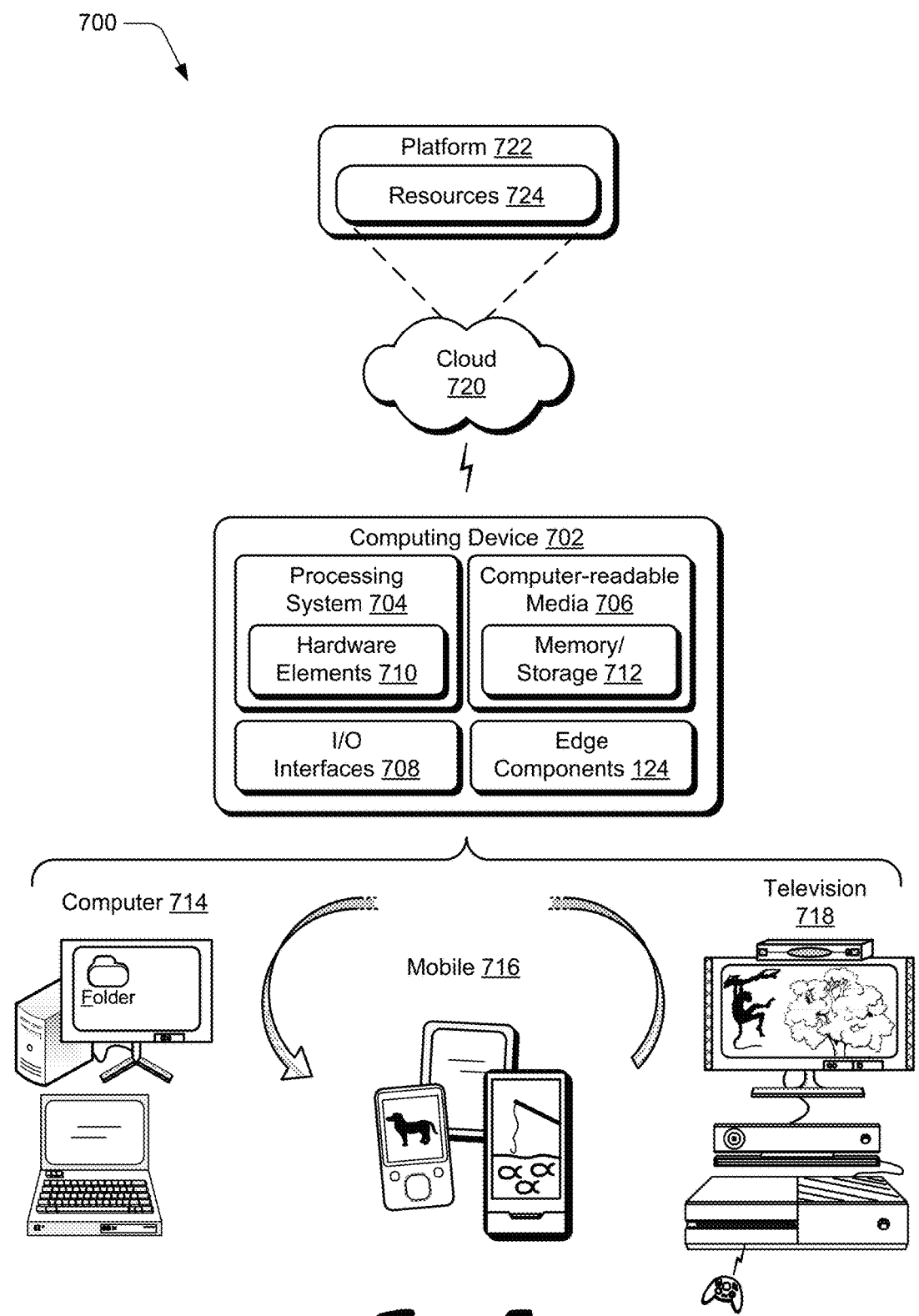
FIG. 7 depicts a system showing an example of various computing devices that may leverage the shell designs described herein.

FIG. 7 illustrates an example system generally at 700 that includes an example computing device 702 that is representative of one or more computing systems and/or devices that may utilize the various techniques described herein as shown by inclusion of the edge components 124. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that may employ the edge components 124 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1006 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" refers to media and/or devices that enable persistent storage of information in contrast to mere signal transmission, carrier waves, or signals per se. Thus, computer-readable storage media does not include transitory media, or signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

As further illustrated in FIG. 7, the example system 700 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 700, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 702 may assume a variety of different configurations, such as for computer 714, mobile 716, and television 718 uses. Each of these configurations includes devices that may have generally different constructs and capabilities, and thus the computing device 702 may be configured according to one or more of the different device classes. For instance, the computing device 702 may be implemented as the computer 714 class of a device that includes a personal computer, desktop computer, a multi-screen computer, laptop computer, netbook, and so on.

The computing device 702 may also be implemented as the mobile 716 class of device that includes mobile devices, such as a mobile phone, portable music player, portable gaming device, a tablet computer, a multi-screen computer, and so on. The computing device 702 may also be implemented as the television 718 class of device that includes devices having or connected to generally larger screens in casual viewing environments. These devices include televisions, set-top boxes, gaming consoles, and so on.

The techniques described herein may be supported by these various configurations of the computing device 702 and are not limited to the specific examples of the techniques described herein. This functionality may also be implemented all or in part through use of a distributed system, such as over a "cloud" 720 via a platform 722 as described below.

The cloud 720 includes and/or is representative of a platform 722 for resources 724. The platform 722 abstracts underlying functionality of hardware (e.g., servers) and software resources of the cloud 720. The resources 724 may include applications and/or data that can be utilized while computer processing is executed on servers that are remote from the computing device 702. Resources 724 can also include services provided over the Internet and/or through a subscriber network, such as a cellular or Wi-Fi network.

The platform 722 may abstract resources and functions to connect the computing device 702 with other computing devices. The platform 722 may also serve to abstract scaling of resources to provide a corresponding level of scale to encountered demand for the resources 724 that are implemented via the platform 722. Accordingly, in an interconnected device embodiment, implementation of functionality described herein may be distributed throughout the system 700. For example, the functionality may be implemented in part on the computing device 702 as well as via the platform 722 that abstracts the functionality of the cloud 720.

EXAMPLE IMPLEMENTATIONS

Example implementations of techniques described herein include, but are not limited to, one or any combinations of one or more of the following examples:

Example 1

A computing device comprising: a housing configured to contain and secure componentry for the computing device; a display module including operational components of a display device for the computing device positioned within the housing, a topside of the display module being oriented towards an outside of the housing; and an edge component integrated with the computing device having a shell with a reduced height portion, the edge component arranged in the housing with the reduced height portion of the shell positioned underneath the display module such that the display module partially overlaps the shell of the edge component along an underside of the display module.

Example 2

A computing device as described in any one or more of the examples in this section, wherein the edge component comprises a peripheral port of the computing device that supports connection of the computing device to peripheral devices.

Example 3

A computing device as described in any one or more of the examples in this section, wherein the peripheral port comprises a universal serial bus (USB) port connectable to USB peripheral devices.

Example 4

A computing device as described in claim 1, wherein the reduced height portion is reduced relative to an overall height of the shell.

Example 5

A computing device as described in any one or more of the examples in this section, further comprising a cover secured to the housing that extends from edge to edge across the computing device and forms an outer surface of the computing device.

Example 6

A computing device as described in any one or more of the examples in this section 5, wherein the display module is stacked within the housing between the cover and the edge component with the underside of the display module overlapping the shell of the edge component within a cutout portion created by the reduced height portion.

Example 7

A computing device as described in any one or more of the examples in this section, wherein: arrangement of the housing, cover, and display module creates a bezel region around edges of the device; and the edge component is positioned at least partially within the bezel region.

Example 8

A computing device as described in any one or more of the examples in this section, further comprising a printed circuit board (PCB) located towards an underside of the computing housing that is opposite the cover, wherein the edge component includes more contacts configured to physically and communicatively connect the edge component to the PCB.

Example 9

A computing device as described in any one or more of the examples in this section, wherein the contacts are configured to include a jog in a routing of contacts that follows a jog in the shell created due to the reduced height portion.

Example 10

A computing device as described in any one or more of the examples in this section, wherein the reduced height portion forms a cutout portion in the shell into which the display module fits and the cutout portion is configured to have a shape that matches a shape along edges of the display module.

Example 11

An edge component for inclusion in a computing device comprising: a shell having a reduced height portion, the reduced height portion of the shell configured to fit into a housing for the computing device underneath a display module of the computing device when the edge component is assembled within the housing such that the display module partially overlaps the shell of the edge component along an underside of the display module.

Example 12

An edge component as described in any one or more of the examples in this section, wherein the edge component comprises a full-sized, standard USB port for the computing device.

Example 13

An edge component as described in any one or more of the examples in this section, wherein the edge component comprises a connector configured to facilitate connections to peripheral devices.

Example 14

An edge component as described in any one or more of the examples in this section, wherein the edge component is configured to include devices that enable wireless connections to peripheral devices.

Example 15

An edge component as described in any one or more of the examples in this section, wherein the edge component further includes contacts routed through the shell for connection to a printed circuit board (PCB) of the computing device, the contacts configured to include a jog in a routing of contacts that follows a jog in the shell created due to the reduced height portion of the shell.

Example 16

An edge component as described in any one or more of the examples in this section, wherein: the reduced height portion of the shell forms a cutout portion into which the display module is configured to fit; and a shape of the cutout portion is configured to match a shape along edges of the display module.

Example 17

An apparatus comprising: a housing configured to contain and secure componentry for the apparatus; a display module positioned within the housing with an outer surface of the display module being oriented towards an outside of the housing; and a universal serial bus (USB) port integrated with the apparatus having a shell with a reduced height portion, the USB port arranged in the housing with the reduced height portion of the shell positioned underneath the display module such that the display module partially overlaps the shell of the edge component along an inner surface of the display module.

Example 18

An apparatus as described in any one or more of the examples in this section, wherein the universal serial bus (USB) port is configured to mate with a full-sized, standard USB plug of a peripheral device.

Example 19

An apparatus as described in any one or more of the examples in this section, further comprising a cover secured to the housing that extends from edge to edge across the apparatus and forms an outer surface of the apparatus; and wherein the display module is stacked within the housing between the cover and the universal serial bus (USB) port with the inner surface of the display module overlapping the shell of the USB port within a cutout portion created by the reduced height portion.

Example 20

An apparatus as described in any one or more of the examples in this section, wherein the apparatus comprises a thin-form factor computing device.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:
1. A computing device comprising:
  a housing configured to contain and secure componentry for the computing device;
  a display module including operational components of a display device for the computing device positioned within the housing, a topside of the display module being oriented towards an outside of the housing; and
  an edge component integrated with the computing device having a shell with a reduced height portion that forms a cutout portion in the shell into which the display module fits and the cutout portion having a shape that matches a shape along edges of the display module, the edge component arranged in the housing with the reduced height portion of the shell positioned underneath the display module such that the display module partially overlaps the shell of the edge component along an underside of the display module.
2. A computing device as described in claim 1, wherein the edge component comprises a peripheral port of the computing device that supports connection of the computing device to peripheral devices.

3. A computing device as described in claim 2, wherein the peripheral port comprises a universal serial bus (USB) port connectable to USB peripheral devices.
4. A computing device as described in claim 1, wherein the reduced height portion is reduced relative to an overall height of the shell.
5. A computing device as described in claim 1, further comprising a cover secured to the housing that extends from edge to edge across the computing device and forms an outer surface of the computing device.
6. A computing device as described in claim 5, wherein the display module is stacked within the housing between the cover and the edge component with the underside of the display module overlapping the shell of the edge component within a cutout portion created by the reduced height portion.
7. A computing device as described in claim 5, wherein: arrangement of the housing, the cover, and the display module creates a bezel region around edges of the computing device; and the edge component is positioned at least partially within the bezel region.
8. A computing device as described in claim 5, further comprising a printed circuit board (PCB) located towards an underside of the computing housing that is opposite the cover, wherein the edge component includes more contacts configured to physically and communicatively connect the edge component to the PCB.
9. A computing device as described in claim 8, wherein the contacts are configured to include a jog in a routing of contacts that follows a jog in the shell created due to the reduced height portion.
10. An edge component for inclusion in a computing device comprising:
  a shell having a reduced height portion, the reduced height portion of the shell configured to fit into a housing for the computing device underneath a display module of the computing device when the edge component is assembled within the housing such that the display module partially overlaps the shell of the edge component along an underside of the display module, the edge component comprising a connector configured to facilitate connections to peripheral devices.
11. An edge component as described in claim 10, wherein the edge component comprises a full-sized, standard USB port for the computing device.
12. An edge component as described in claim 10, wherein the edge component is configured to include devices that enable wireless connections to peripheral devices.
13. An edge component as described in claim 10, wherein the edge component further includes contacts routed through the shell for connection to a printed circuit board (PCB) of the computing device, the contacts configured to include a jog in a routing of contacts that follows a jog in the shell created due to the reduced height portion of the shell.
14. An edge component as described in claim 10, wherein: the reduced height portion of the shell forms a cutout portion into which the display module is configured to fit; and a shape of the cutout portion is configured to match a shape along edges of the display module.
15. An apparatus comprising:
  a housing configured to contain and secure componentry for the apparatus;
  a display module positioned within the housing with an outer surface of the display module being oriented towards an outside of the housing; and
  a universal serial bus (USB) port integrated with the apparatus having a shell with a reduced height portion, the USB port arranged in the housing with the reduced height portion of the shell positioned underneath the display module such that the display module partially overlaps the shell of an edge component along an inner surface of the display module.

16. An apparatus as described in claim 15, wherein the universal serial bus (USB) port is configured to mate with a full-sized, standard USB plug of a peripheral device.

17. An apparatus as described in claim 15, further comprising a cover secured to the housing that extends from edge to edge across the apparatus and forms an outer surface of the apparatus; and wherein the display module is stacked within the housing between the cover and the universal serial bus (USB) port with the inner surface of the display module overlapping the shell of the USB port within a cutout portion created by the reduced height portion.

18. An apparatus as described in claim 15, wherein the apparatus comprises a thin-form factor computing device.

19. An apparatus as described in claim 15, wherein an arrangement of the housing and the display module creates a bezel region around edges of the apparatus; and the USB port is positioned at least partially within the bezel region.

20. An apparatus as described in claim 15, wherein the reduced height portion forms a cutout portion in the shell into which the display module fits and the cutout portion is configured to have a shape that matches a shape along edges of the display module.

* * * * *